(12) United States Patent
Hayashi

(10) Patent No.: US 7,372,604 B2
(45) Date of Patent: May 13, 2008

(54) MULTI-BEAM SCANNER, MULTI-BEAM SCANNING METHOD, SYNCHRONIZING BEAM DETECTING METHOD AND IMAGE FORMING APPARATUS

(75) Inventor: Yoshinori Hayashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/745,919

(22) Filed: May 8, 2007

(65) Prior Publication Data

US 2007/0206257 A1  Sep. 6, 2007

Related U.S. Application Data

(62) Division of application No. 11/203,297, filed on Aug. 15, 2005, now Pat. No. 7,233,425, which is a division of application No. 09/860,520, filed on May 21, 2001, now Pat. No. 6,956,685.

(30) Foreign Application Priority Data

May 19, 2000 (JP) .............................. 2000-148056

(51) Int. Cl.
*G02B 26/08* (2006.01)
(52) U.S. Cl. ...................... 359/204; 359/216; 359/900; 347/235; 347/243
(58) Field of Classification Search ................. 359/204
See application file for complete search history.

(56) References Cited

U.S. PATENT DOCUMENTS 5,461,412 A * 10/1995 Paoli et al. ................. 347/243

(Continued)

FOREIGN PATENT DOCUMENTS

| JP | 03-221913 | 9/1991 |
|----|-----------|--------|
| JP | 05-066650 | 3/1993 |
| JP | 9-76562 | 3/1997 |
| JP | 11-194285 | 7/1999 |
| JP | 2000-111820 | 4/2000 |
| JP | 2000-155277 | 6/2000 |
| JP | 2000-330050 | 11/2000 |

OTHER PUBLICATIONS

U.S. Appl. No. 11/745,919, filed May 8, 2007, Hayashi.
U.S. Appl. No. 11/759,642, filed Jun. 7, 2007, Nakamura et al.

*Primary Examiner*—James Phan
(74) *Attorney, Agent, or Firm*—Oblon, Spivak, McClelland, Maier & Neustadt, P.C.

(57) ABSTRACT

A multi-beam scanner includes light sources, a deflector deflecting the beams emitted from the light sources at an equiangular velocity, a scanning image-forming optical system guiding the deflected beams to a surface so as to be formed into light spots on the scanned surface, a light receiving device receiving the beams deflected toward optical write-in starting portions on the scanned surface as synchronizing beams, and a synchronizing beam optical system guiding the beams deflected toward the optical write-in starting portions on the scanned surface to the light receiving device. The scanning image-forming optical system includes two or more scanning positive lenses, with a region having a positive power in a main scanning direction on an optical write-in starting side, and each deflected beam received by the light receiving device passes through one or more but not all of the scanning positive lenses to be guided to the light receiving device. An optical path length from the deflector to the light receiving device is set larger than an optical path length from the deflector to the scanned surface in the synchronizing beam optical system.

33 Claims, 7 Drawing Sheets

U.S. PATENT DOCUMENTS

| | | |
|---|---|---|
| 5,557,448 A | 9/1996 | Endo et al. |
| 5,570,224 A | 10/1996 | Endo et al. |
| 5,581,392 A | 12/1996 | Hayashi |
| 5,652,670 A | 7/1997 | Hayashsi |
| 5,786,594 A | 7/1998 | Ito et al. |
| 5,875,051 A | 2/1999 | Suzuki et al. |
| 5,936,756 A | 8/1999 | Nakajima |
| 5,986,791 A | 11/1999 | Suzuki et al. |
| 5,999,345 A | 12/1999 | Nakajima et al. |
| 6,052,211 A | 4/2000 | Nakajima |
| 6,061,162 A | 5/2000 | Shiraishi et al. |
| 6,069,724 A | 5/2000 | Hayashi et al. |
| 6,081,386 A | 6/2000 | Hayashi et al. |
| 6,091,534 A | 7/2000 | Nakajima |
| 6,104,522 A | 8/2000 | Hayashi et al. |
| 6,141,133 A | 10/2000 | Suzuki et al. |
| 6,178,029 B1 | 1/2001 | Kamikubo |
| 6,185,026 B1 | 2/2001 | Hayashi et al. |
| 6,198,562 B1 | 3/2001 | Hayashi et al. |
| 6,222,662 B1 | 4/2001 | Suzuki et al. |
| 6,229,638 B1 | 5/2001 | Sakai et al. |
| 6,239,860 B1 | 5/2001 | Ito |
| 6,384,949 B1 | 5/2002 | Suzuki |
| 6,388,792 B1 | 5/2002 | Atsuumi et al. |
| 6,400,917 B2 | 6/2002 | Nakazato et al. |
| 6,417,509 B1 | 7/2002 | Atsuumi et al. |
| 6,429,956 B2 | 8/2002 | Itabashi |
| 6,445,482 B1 | 9/2002 | Hayashi |
| 6,448,998 B1 | 9/2002 | Suzuki et al. |
| 6,498,617 B1 | 12/2002 | Ishida et al. |
| 6,501,585 B2 | 12/2002 | Shiraishi et al. |
| 6,573,921 B2 | 6/2003 | Hayashi |
| 6,587,245 B2 | 7/2003 | Hayashi |
| 6,757,089 B2 | 6/2004 | Hayashi |
| 6,768,506 B2 | 7/2004 | Hayashi et al. |
| 6,771,296 B2 | 8/2004 | Hayashi et al. |
| 6,788,446 B2 | 9/2004 | Hayashi |
| 6,822,666 B2 | 11/2004 | Kato |
| 6,903,856 B2 | 6/2005 | Hayashi |
| 6,906,739 B2 | 6/2005 | Suzuki et al. |
| 6,977,762 B2 | 12/2005 | Hayashi |
| 6,987,593 B2 | 1/2006 | Hayashi et al. |
| 7,110,016 B2 | 9/2006 | Suzuki et al. |
| 7,145,705 B2 | 12/2006 | Hayashi |
| 7,233,425 B2 | 6/2007 | Hayashi et al. |
| 2006/0000990 A1 | 1/2006 | Hayashi et al. |
| 2006/0245009 A1 | 11/2006 | Akiyama et al. |

* cited by examiner

IMAGE SURFACE CURVATURE

CONSTANT VELOCITY

MULTI-BEAM SCANNER, MULTI-BEAM SCANNING METHOD, SYNCHRONIZING BEAM DETECTING METHOD AND IMAGE FORMING APPARATUS

CROSS-REFERENCE TO RELATED APPLICATIONS

The present application is a divisional of application Ser. No. 11/203,297, filed Aug. 15, 2005, now U.S. Pat. No. 7,233,425, which is a divisional of application Ser. No. 09/860,520, filed May 21, 2001, now U.S. Pat. No. 6,956, 685, and claims priority from Japanese Patent Application No. 2000-148056 filed in the Japanese Patent Office on May 19, 2000, the contents of each which are hereby incorporated by reference in their entirety.

BACKGROUND OF THE INVENTION

1. Field of the Invention

The present invention relates to a multi-beam scanner, a multi-beam scanning method, a method for detecting a synchronizing beam in multi-beam scanning, and an image forming apparatus.

2. Discussion of the Background

There has recently appeared a multi-beam scanning method for light scanning that can meet requirements for increasing speed in light scanning.

The multi-beam scanning method employs a plurality of light sources which can be independently modulated according to an image signal. Typically, one of those light sources may be a semiconductor laser where the emitted light wavelength varies slightly over different production lots of the laser.

If multi-beam scanning is conducted by combining a plurality of semiconductor lasers having different emitted light wavelengths, the chromatic aberration of a scanning optical system positioned between the light source and the scanned surface has the effect that the scanning optical system gives different optical actions for different beams (having different wavelengths). Therefore, if a long line is written in a sub-scanning direction, a phenomenon called vertical line fluctuation occurs where the thus written line wavers minutely.

The vertical line fluctuation typically appears notably on the write-in termination side of light scanning. Even if an image other than a vertical line is written to a portion with a notable vertical line fluctuation, an image density difference due to the shift in superposing of dots written in by the plurality of beams appears.

One of the methods for avoiding such a phenomenon is to use an achromatism-processed optical system as the above-mentioned scanning optical system. An achromatism-processed scanning optical system, however, is expensive in manufacturing costs and so contributes to increased costs of the relevant multi-beam scanner as a whole.

Another method may be a method for making up a light source apparatus by combining semiconductor lasers having an emitted light wavelength difference not larger than a predetermined value, as disclosed in Japanese Patent Application Laid-Open No. Hei 9-76562, by which, however, the vertical line fluctuation which is caused by the difference in the emitted light wavelengths of the combined beams cannot be mitigated further.

SUMMARY OF THE INVENTION

The present invention has been made in view of the above-discussed and other problems and addresses the above-discussed and other problems.

Accordingly, preferred embodiments of the present invention provide a novel multi-beam scanning apparatus and a novel multi-beam scanning method that effectively mitigate the phenomenon of vertical line fluctuation due to the difference in the wavelength of light emitted from the light source in multi-beam scanning.

According to a preferred embodiment of the present invention, a method of detecting a synchronizing beam for controlling optical write-in starting of each beam for scanning each scanning line in a multi-beam scanner includes the steps of: deflecting each of beams, emitted from a plurality of light sources and modulated independently according to an image signal, by a common deflector at an equiangular velocity toward an optical write-in starting portion of a scanned surface, and converging the deflected beam toward the scanned surface by a scanning image-forming optical system including lenses to form a plurality of light spots on the scanned surface, separated from each other in a sub-scanning direction, to simultaneously scan a plurality of scanning lines by use of the plurality of light spots; and sequentially guiding each deflected beam by a synchronizing beam optical system of a synchronization detecting system toward a light receiving device of the synchronization detecting system so as to be received by the light receiving device as the synchronizing beam, the synchronization detecting system reducing the value of a parameter $d_1/\omega_1$, where $d_1$ is a maximum shift in a beam position in a main scanning direction at a light receiving face position of the light receiving device, caused by a difference in inter-beam wavelength in a synchronizing beam detecting view angle, and $\omega_1$ is a beam displacement at the light receiving face position corresponding to a unit change in a view angle of the synchronizing beam detecting view angle.

The synchronizing beam detecting view angle is a view angle for regular incidence of a reference beam as deflected by the deflector upon the light receiving face of the light receiving device.

The above-mentioned $d_1$ and $\omega_1$ are described later.

In the above-mentioned synchronizing beam detecting method, some of the lenses contained in the scanning form-imaging optical system can be utilized as a part of the synchronizing beam optical system of the synchronization detecting system. Here, when n≧2 number of lenses are contained in the scanning image-forming optical system, "Some of the lenses contained in the scanning form-imaging optical systemr" referred to here indicate m (n>m≧1) number of lenses of the n (≧2) number of lenses.

Furthermore, in the above-mentioned synchronization detecting method, a dedicated optical system can be used as the synchronizing beam optical system to thereby reduce the parameter d1/ω1 to 0.

According to another preferred embodiment of the present invention, a multi-beam scanner includes a plurality of light sources, a deflector, a scanning optical system, a light receiving device, and a synchronizing beam optical system.

Each of the plurality of light sources independently modulates a beam according to an image signal.

The deflector has a deflecting/reflecting face for deflecting the beams of the plurality of light sources at an equiangular velocity.

The scanning image-forming optical system is provided for guiding the beams deflected by the deflector to a scanned surface to thereby form a plurality of light spots on the scanned surface.

The light receiving device is provided common to a plurality of beams for sequentially and individually receiving the beams deflected toward the optical write-in starting portion on the scanned surface.

The synchronizing beam optical system is provided for guiding the deflected beams to the above-mentioned light receiving device.

The above-mentioned plurality of light sources may be two semiconductor lasers or more or a semiconductor laser array. When a semiconductor laser array is used, each of light emitting portions arranged in the array is used as a light source.

When two semiconductor lasers or more are used, on the other hand, beams from those semiconductor lasers may be combined using a combination prism or may be incident to the deflector with their respective opening angles in the main scanning direction.

The deflector may be a rotary uni-facial mirror, a rotary two-facial mirror, or a rotary multi-facial mirror. Of these, a rotary multi-facial mirror is well suited.

The scanning image-forming optical system can be constituted from one lens or more, or one lens or more and one image forming mirror or more having an image forming action.

Although an optical system for forming a light spot by converging a deflected beam to a scanned surface can be constituted from only one image combining mirror having an image forming action, such an optical system has originally no chromatic aberration, and so has no problem of the above-mentioned vertical line fluctuation. Therefore, the scanning image-forming optical system in a multi-beam scanner according to the present invention always includes one lens or more.

The scanned surface scanned by a plurality of light spots is specifically a photosensitive surface of a photosensitive medium.

In the above multi-beam scanner, the scanning image-forming optical system has two or more scanning positive lenses. The scanning positive lenses have a region having a positive power in the main scanning direction on the optical write-in starting side. Each deflected beam to be detected by the light receiving device passes through one or more of the two or more scanning positive lenses but not all of them and then is guided to the light receiving device. In other words, some of the scanning positive lenses (that is, lenses which the deflected beam to be detected by the light receiving device passes through) constitutes at least a part of the synchronizing beam optical system.

An optical path length from the deflector up to the light receiving device is set larger than the optical path length from the deflector up to the scanned surface in the synchronizing beam optical system.

The above-mentioned optical path length from the deflector up to the scanned surface in the synchronizing beam optical system is an optical path length between the scanned surface and the deflecting/reflecting face of the deflector in a virtual optical path when an optical path of a deflected beam guided by the synchronizing beam optical system is supposed to be developed linearly.

In the above multi-beam scanner, the light receiving face of the light receiving device can be arranged near the image forming position in the main scanning direction of the deflected beam guided by the synchronizing beam optical system.

In the above multi-beam scanner, the synchronizing beam optical system can have an anamorphic optical element for forming as an image a deflected beam in the vicinity of the light receiving face of the light receiving device in the sub-scanning direction. That is, in this case, the synchronizing beam optical system has an anamorphic optical element besides the above-mentioned scanning positive lens.

In the above multi-beam scanner, the scanning image-forming optical system can be constituted by two scanning positive lenses having a region having a positive power in the main scanning direction with one of these two lenses present on the side of the deflector used as a part of the synchronizing beam optical system.

According to another preferred embodiment of the present invention, a multi-beam scanner includes a plurality of light sources configured to emit beams independently modulated according to an image signal, respectively, a deflector having a deflecting/reflecting face and configured to deflect the beams emitted from the plurality of light sources at an equiangular velocity, a scanning image-forming optical system that guides the beams deflected by the deflector to a scanned surface so as to be formed into a plurality of light spots on the scanned surface, a light receiving device that sequentially and individually receives the beams deflected toward optical write-in starting portions on the scanned surface as synchronizing beams, the light receiving device being common to the synchronizing beams, and a synchronizing beam optical system that guides the beams deflected to the optical write-in starting portions to the light receiving device. In the multi-beam scanner, the scanning image-forming optical system has one scanning lens or more, and the synchronizing beam optical system includes one or more of the one scanning lens or more and a refracting optical element. Each deflected beam to be received by the light receiving device passes through the one or more of the one scanning lens or more and a principal ray of the deflected beam passed through the scanning lens is deflected by the refracting optical element so as to be guided to the light receiving device. Further, a shift, due to a difference in wavelength of the deflected beam, of an incidence position on the light receiving device of the deflected beam in a synchronizing beam detecting angle is reduced by a difference in a refracting action of the refracting optical element due to the deflected beam wavelength difference.

That is, in the above multi-beam scanner, the scanning lenses contained in the scanning image-forming optical system can all be used as a part of the synchronizing beam optical system.

In the above multi-beam scanner, the scanning image-forming optical system can be constituted by two scanning lenses in such a configuration that these two lenses may be used as a positive lens (which corresponds to a scanning positive lens in the above multi-beam scanner) having a region having a positive power in the main scanning direction on the optical write-in starting side, one of these scanning lenses which is present on the side of the deflector constituting a part of the synchronizing beam optical system.

In the above multi-beam scanner, the refracting optical element can be used as a converging lens having a positive power in the main scanning direction in such a configuration that this converging lens may be decentered to deflect the principal ray of an incident deflected beam to thereby form as an image the deflected beam in the main scanning direction in the vicinity of the light receiving face of the light receiving device using the positive power of the main scanning direction.

In the above multi-beam scanner, the refracting optical element may be a wedge-shaped prism. At least one face of the wedge-shaped prism can be provided with a positive power in the sub-scanning direction so that a deflected beam may be formed in the sub-scanning direction as an image in the vicinity of the light receiving face of the light receiving device using this positive power.

In the above multi-beam scanner, the change rate due to wavelength of the refractive index of the refracting optical element can be set larger than that of the scanning lenses constituting a part of the synchronizing beam optical system.

According to another preferred embodiment of the present invention, a multi-beam scanner includes a plurality of light sources configured to emit beams independently modulated according to an image signal, respectively, a deflector having a deflecting/reflecting face and configured to deflect the beams emitted from the plurality of light sources at an equiangular velocity, a scanning image-forming optical system that guides the beams deflected by the deflector to a scanned surface so as to be formed into a plurality of light spots on the scanned surface, a light receiving device that sequentially and individually receives the beams deflected toward optical write-in starting portions on the scanned surface as synchronizing beams, the light receiving device being common to the synchronizing beams, and a synchronizing beam optical system that guides the beams deflected to the optical write-in starting portions to the light receiving device. In the multi-beam scanner, the scanning image-forming optical system and the synchronizing beam optical system are provided mutually separately in such a configuration that the synchronizing beam optical system guides each deflected beam to the same position on the light receiving face of the light receiving device irrespective of its wavelength in terms of the synchronizing beam detecting view angle. In this case, the synchronizing beam optical system can be provided as a converging lens.

In the above multi-scanners, there may be provided two light sources that can modulate beams individually according to an image signal. In this case, these two light sources can be provided as mutually separate semiconductor lasers in such a configuration that the beams from these semiconductor lasers may be incident onto the deflector with their respective opening angles in the main scanning direction through a coupling lens. The principal rays of beams from those semiconductor lasers can be made to intersect in the main scanning direction in the vicinity of the deflecting reflecting face of the deflector. Thus, the deflecting/reflecting face can be reduced in area to thereby minimize the deflector.

Further, the beams from those semiconductor lasers can be formed through a line image-forming optical system as line images long in the main scanning direction and mutually separated in the sub-scanning direction. Thus, face-tilting of the deflecting/reflecting face in the deflector can be corrected. The line image-forming optical system may be a positive cylindrical lens or a concave cylindrical mirror.

In this case, since each light source typically emits a diverged beam, it is transformed by a coupling optical element to a beam form suited for the next-stage optical system. The beam form transformed by the coupling optical element may be a parallel beam or a diverging or converging beam roughly equal to a parallel beam.

According to still another preferred embodiment of the present invention, a method of multi-beam scanning includes the steps of: emitting from a plurality of light sources beams independently modulated according to an image signal, respectively; deflecting the beams emitted from the plurality of light sources by a deflector at an equiangular velocity; guiding the deflected beams to a scanned surface by a scanning image-forming optical system so as to be formed into a plurality of light spots on the scanned surface, separated from each other in a sub-scanning direction; and sequentially and individually guiding the beams deflected toward optical write-in starting portions on the scanned surface by a synchronizing beam optical system so as to be received by a light receiving device common to the guided beams. In the method, the scanning image-forming optical system includes two or more scanning positive lenses, and the scanning positive lenses have a region having a positive power in a main scanning direction on an optical write-in starting side thereof. Further, each deflected beam to be received by the light receiving device passes through one or more of the two scanning positive lenses or more but not all of the two scanning positive lenses or more to be guided to the light receiving device, and an optical path length from the deflector to the light receiving device is set larger than an optical path length from the deflector to the scanned surface in the synchronizing beam optical system.

According to still another preferred embodiment of the present invention, a method of multi-beam scanning includes the steps of: emitting from a plurality of light sources beams independently modulated according to an image signal, respectively; deflecting the beams emitted from the plurality of light sources by a deflector at an equiangular velocity; guiding the deflected beams to a scanned surface by a scanning image-forming optical system so as to be formed into a plurality of light spots on the scanned surface, separated from each other in a sub-scanning direction; and sequentially and individually guiding the beams deflected toward optical write-in starting portions on the scanned surface by a synchronizing beam optical system so as to be received by a light receiving device common to the guided beams. In the method, the scanning image-forming optical system has one or more scanning lenses, and the synchronizing beam optical system include one or more of the one or more scanning lenses and a refracting optical element. Further, each deflected beam to be received by the light receiving device passes through the one or more of the scanning lenses and a principal ray of the deflected beam passed through the scanning lens is deflected by the refracting optical element so as to be guided to the light receiving device, and a shift, due to a difference in wavelength of the deflected beam, of an incidence position on the light receiving device of the deflected beam in a synchronizing beam detecting angle being reduced by a difference in a refracting action of the refracting optical element due to the deflected beam wavelength difference.

According to still another preferred embodiment of the present invention, a method of multi-beam scanning includes the steps of: emitting from a plurality of light sources beams independently modulated according to an image signal, respectively; deflecting the beams emitted from the plurality of light sources by a deflector at an equiangular velocity; guiding the deflected beams to a scanned surface by a scanning image-forming optical system so as to be formed into a plurality of light spots on the scanned surface, separated from each other in a sub-scanning direction; and sequentially and individually guiding the beams deflected toward optical write-in starting portions on the scanned surface by a synchronizing beam optical system so as to be received by a light receiving device common to the guided beams. In the method, the scanning image-forming optical system and the synchronizing beam optical system are mutually separate, and the synchronizing beam optical system guides each deflected beam to a substantially same position on the light receiving face of the light receiving device irrespective of its wavelength with respect to a synchronizing beam detecting view angle.

According to still another preferred embodiment of the present invention, an image forming apparatus includes: a photosensitive medium having a photosensitive surface; a charging device configured to uniformly charge the photosensitive surface; a multi-beam scanner configured to scan the uniformly charged photosensitive surface of the photosensitive medium to form a latent image on the photosensitive surface; and a visualizing device configured to visualize the latent image. The multi-beam scanner includes a plurality of light sources configured to emit beams independently modulated according to an image signal, respectively; a deflector having a deflecting/reflecting face and configured to deflect the beams emitted from the plurality of light sources at an equiangular velocity; a scanning image-forming optical system that guides the beams deflected by the deflector to the photosensitive surface of the photosensitive medium so as to be formed into a plurality of light spots constituting the latent image on the photosensitive surface; a light receiving device that sequentially and individually receives the beams deflected toward optical write-in starting portions on the photosensitive surface as synchronizing beams, the light receiving device being common to the synchronizing beams; and a synchronizing beam optical system that guides the beams deflected toward the optical write-in start portions on the photosensitive surface to the light receiving device. The scanning image-forming optical system includes two or more scanning positive lenses, and the scanning positive lenses have a region having a positive power in a main scanning direction on an optical write-in starting side thereof. Each deflected beam to be received by the light receiving device passes through one or more of the two or more scanning positive lenses but not all of the two or more scanning positive lenses to be guided to the light receiving device, and an optical path length from the deflector to the light receiving device being set larger than an optical path length from the deflector to the photosensitive surface in the synchronizing beam optical system.

According to still another preferred embodiment, in the above image forming apparatus, the scanning image-forming optical system has one or more scanning lenses, and the synchronizing beam optical system includes one or more of the one or more scanning lenses and a refracting optical element. Further, each deflected beam to be received by the light receiving device passes through the one or more of the one or more scanning lenses and a principal ray of the deflected beam passed through the scanning lens is deflected by the refracting optical element so as to be guided to the light receiving device, and a shift, due to a difference in wavelength of the deflected beam, of an incidence position on the light receiving device of the deflected beam in a synchronizing beam detecting angle is reduced by a difference in the refracting action of the refracting optical element due to the deflected beam wavelength difference.

According to still another preferred embodiment of the present invention, in the above image forming apparatus, the scanning image-forming optical system and the synchronizing beam optical system are mutually separate, and the synchronizing beam optical system guides each deflected beam to the substantially same position on the light receiving face of the light receiving device irrespective of its wavelength with respect to a synchronizing beam detecting view angle.

In the above image forming apparatus, the photosensitive medium can be provided as a photoconductive member in such a configuration that an electrostatic latent image formed by uniform changing of the photosensitive surface and the optical scanning of the optical scanner may be visualized to a toner image. The toner image is then fixed to a sheet-shaped recording medium such as transfer paper or an OHP sheet (over-head projector plastic sheet).

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Prior to describing preferred embodiments of the present invention, a vertical line fluctuation and its occurrence mechanism will be described with reference to a background multi-beam scanner.

Figure 7A:
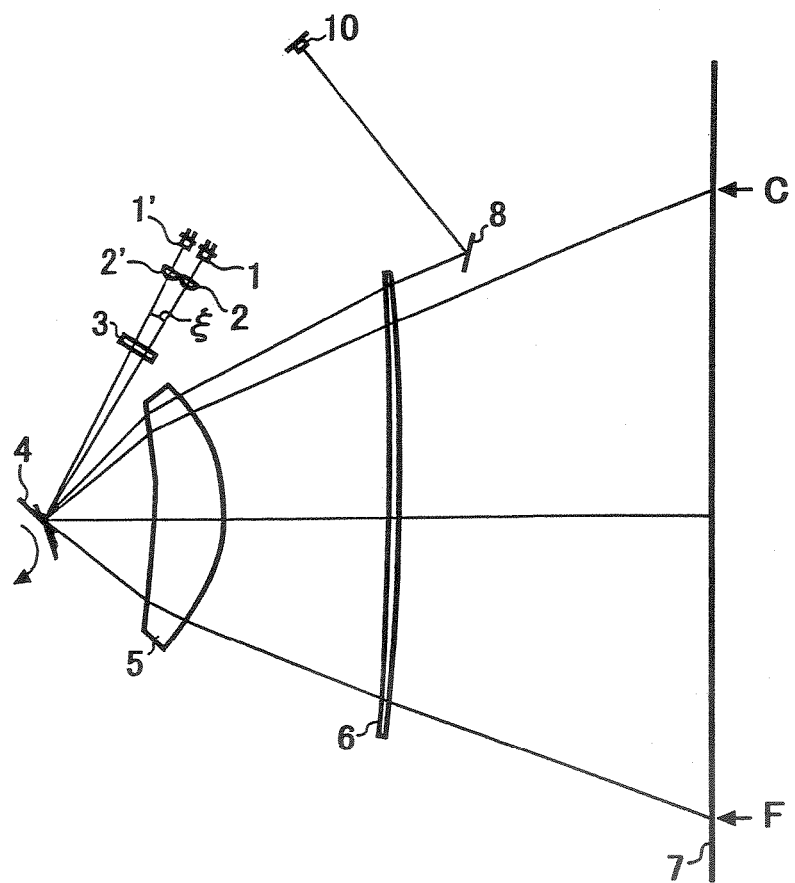
FIG. 7A and FIG. 7B are drawings for explaining a vertical line fluctuation.

In FIG. 7A, semiconductor lasers indicated by reference signs 1 and 1' constitute a plurality of (two) light sources. Diverging beams emitted from the semiconductor lasers 1 and 1' are transformed into respective essentially parallel beams through corresponding coupling lenses 2 and 2', which are a coupling optical element. Although each of those beams emitted from the coupling lenses 2 and 2' is incident onto a deflecting/reflecting face (which is illustrated in the form of a deflecting/reflecting face at a different time corresponding to the rotation of a rotary multi-facial mirror 4) of the rotary multi-facial mirror 4 provided as a deflector with its respective opening angle $\xi$ in the main scanning direction, prior to this incidence, those beams pass through a cylindrical lens as their common line image-forming optical system and then are converged in the sub-scanning direction (a direction corresponding to the sub-scanning direction on the scanned surface in an optical path from each light source up to the scanned surface, i.e., a direction perpendicular to the surface in FIG. 8A) to be formed in the vicinity of the deflecting/reflecting face as a long line image in the main scanning direction (direction corresponding to the main scanning direction on the scanned surface in the optical path from each light source up to the scanned surface).

The above-mentioned opening angle of beam refers to an angle expanded in the main scanning direction of the two beams incident upon the deflecting/reflecting face of the rotary multi-facial mirror 4 as directed to the light source side when viewed from the deflecting/reflecting face side.

The two beams emitted from the coupling lenses 2 and 2' form a minute angle therebetween in the sub-scanning direction, so that the line image long in the main scanning direction formed by the beams are separate from each other in the sub-scanning direction.

When reflected by the deflecting/reflecting face, beams pass through scanning lenses 5 and 6 constituting a scanning image-forming optical system, which have such an action on the beams as to converge them to a scanned surface 7, thus forming their respective light spots. Those light spots are separated from each other in the sub-scanning direction as well as in the main scanning direction so as to be able to scan mutually different scanning lines.

When the rotary multi-facial mirror 4 turns in the arrow direction at an equiangular velocity, the beams reflected by the deflecting/reflecting face are deflected at an equiangular velocity into deflected beams to thereby cause the light spots to simultaneously scan two scanning lines on the scanned surface 7.

Prior to scanning on the scanned surface, those beams are guided through a mirror 8 to a light receiving element 10 provided as the light receiving device (arranged at a position optically equivalent to the scanned surface 7 for forming the beams on the light receiving face as an image) to be detected there. The light receiving element 10 generates a reception light signal. In a predetermined time lapse after the reception light signal is generated, an optical write-in operation starts.

In FIG. 7A, a reference sign C indicates an optical write-in starting portion and a reference sign F indicates an optical write-in terminating portion.

If, in this case, the beams emitted from the semiconductor lasers 1 and 1' have the same wavelength, the optical write-in starting portion C and the optical write-in terminating portion F agree for each beam, thus preventing the vertical line fluctuation from occurring.

If there is a wavelength difference between the beams from the semiconductor lasers 1 and 1', on the other hand, the scanning lenses 5 and 5' have different actions on the beams, so that the optical write-in starting and terminating portions do not agree because the scanning line length is different for each beam by the magnification difference.

Figure 7B:
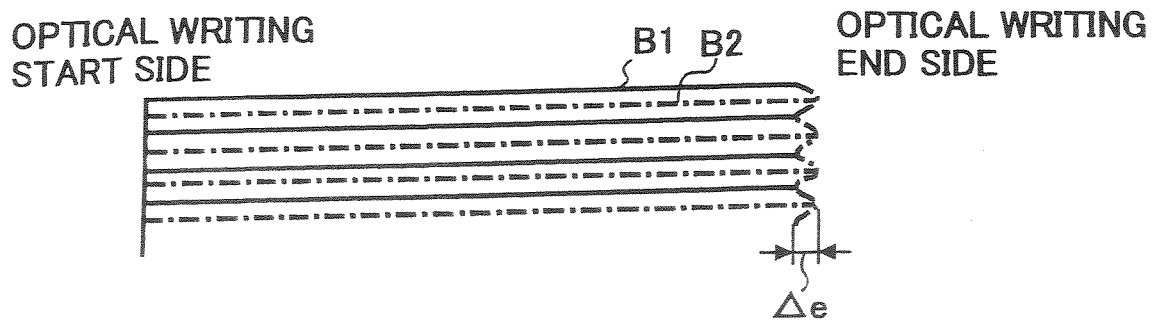

In FIG. 7B, a solid line denoted by a reference sign B1 indicates a scanning line scanned by the beam emitted from the semiconductor laser 1 and a dashed line denoted by a reference sign B2 indicates a scanning line scanned by the beam from the semiconductor laser 1'. Here, it is supposed that the wavelength of the beam emitted from the semiconductor laser 1' is longer than the other.

Since the beam deflection quantity is small between the optical write-in starting portion C and the light receiving element 10, there occurs essentially no difference between the optical write-in starting positions on the side of the optical write-in starting side as illustrated in FIG. 7B, whereas on the optical write-in terminating side, there occurs a shift in the position where a scanning line written in by the beam terminates, so that vertical line fluctuation having an amplitude $\Delta e$ as shown in FIG. 7B occurs.

The above vertical line fluctuation is more specifically described using numerals below.

One example is given below of the optical data in the optical line from the deflecting/reflecting face to the scanned surface 7 of the rotary multi-facial mirror 4. The length dimension has a unit of "mm" (millimeter).

| Face No. | Rm | Rs (0) | X | N | Remarks |
|---|---|---|---|---|---|
| Deflecting/reflecting | ? | ? | 52.1 | | Rotary multi-facial |
| 1** | −312.6 | −312.6 | 31.4 | 1.52395 | Scanning lens 5 |
| 2** | −83.0 | −83.0 | 78.0 | | |
| 3** | −500.0 | −47.7 | 4.0 | 1.52395 | Scanning lens 6 |
| 4 | −950.0 | −23.41 | 143.4 | | |
| 5 | | | | | Scanned surface 7 |

"Rm" represents the near-axis curvature radius in a plane cross section (main scanning cross section) parallel to the main scanning direction including the optical axis, "Rs(0)" represents the near-axis curvature radius on the plane cross section parallel to the sub-scanning direction including the optical axis, "X" represents the inter-face spacing on the optical axis, and "N" represents a refractive index with respect to a reference wavelength of a lens material. The face indicated by "**" has a co-axial non-spherical shape represented by the following equation 1.

$$X = \{(Y^2)/R\}/\{1+\sqrt{(1-(1+K)^2(Y/R)^2)}\} + AY^2 + BY^6 + CY^8 + DY^{10} \tag{1}$$

A face with a face number 1 has the following:

$K=2.667$, $A=1.79E\text{-}07$, $B=-1.08E\text{-}12$, $C=-3.81E\text{-}14$, $D=3.74E\text{-}18$ A face with a face number 2 has the following:

$K=0.02$, $A=2.50E\text{-}07$, $B=9.61E\text{-}12$, $C=4.54E\text{-}15$, $D=-3.03E\text{-}18$ In the above, for example, "2.50E-07" means "$2.50 \times 10^{-7}$". This principle holds true also in the following description.

The face indicated by "*" is non-arc shaped in the main scanning cross section, having its curvature radius in the sub-scanning cross section (plane cross section perpendicular to the main scanning direction) changing continuously with the changing value of Y, which is the lens height in the main scanning direction.

The shape of the face with a face number 3 in the main scanning cross section is expressed by the above-mentioned equation 1 and has the following:

$K=-71.73$, $A=4.33E\text{-}08$, $B=-5.97E\text{-}13$, $C=-1.28E\text{-}16$, $D=5.73E\text{-}21$ The curvature radius in the sub-scanning cross section for a face number 3 is expressed by the following equation 2:

$$Rs(Y) = Rs(0) + \Sigma b_j Y^j \quad (j=1, 2, 3, \ldots) \tag{2}$$

where $b_2=1.60E\text{-}03$, $b_4=-2.37E\text{-}07$, $b_6=1.60E\text{-}11$, $b_8=-5.61E\text{-}16$, $b_{10}=2.18E\text{-}20$, $b_{12}=-1.25E\text{-}24$ (the other coefficients are all 0).

As mentioned above, the beams are formed as a line image near the deflecting/reflecting face in the sub-scanning direction and, in the main scanning direction the beams incident upon the deflecting/reflecting face are made essentially parallel.

Figure 6A:
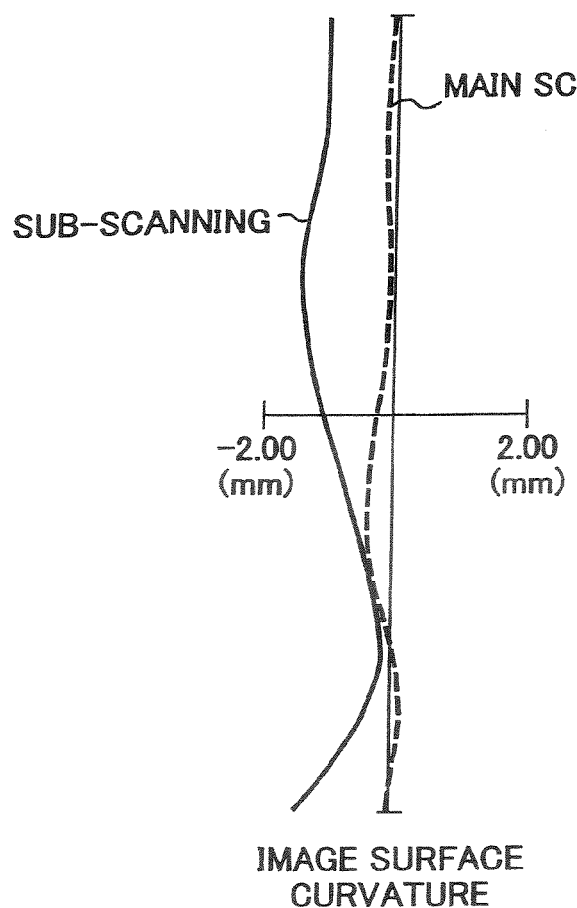
FIG. 6 are drawings illustrating an aberration graph (image face curvature and constant-velocity characteristic) of an optical system used in each of the preferred embodiments.
Figure 6B:
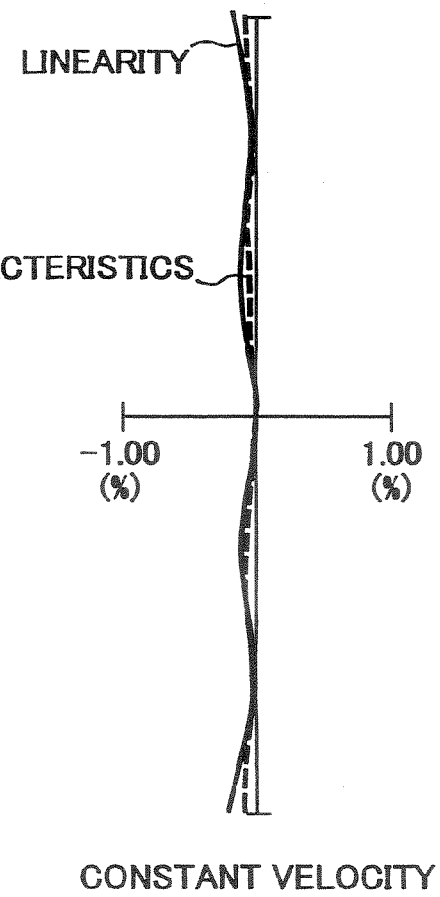

FIG. 6A and FIG. 6B show aberration graphs (image face curvature and constant-velocity characteristic) of an optical system having the above-mentioned example of data. As can be seen from the figure, both the image face curvature and the constant velocity characteristic are very good.

Figure 8A:
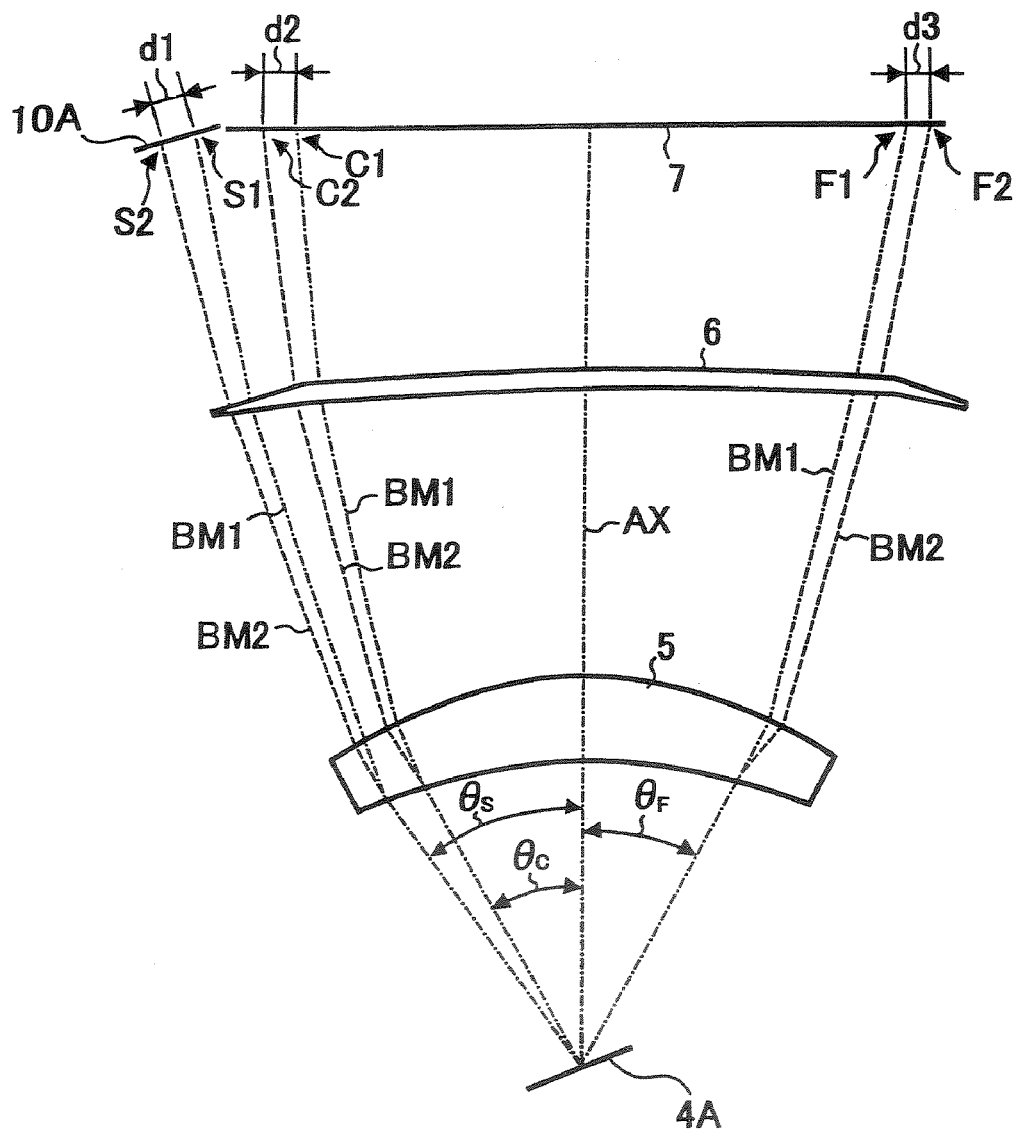
FIG. 8A and FIG. 8B are drawings for explaining reducing of a vertical line fluctuation.

FIG. 8A illustrates how a deflected beam is guided through the scanning lenses 5 and 6 constituting the scanning image-forming optical system to the scanned surface and the light receiving face 10A of the light receiving element.

As illustrated in the figure, angles $\theta_S$, $\theta_C$, and $\theta_F$ are assumed with respect to the optical axis AX of the scanning lenses 5 and 6. The angle $\theta_C$ is a view angle at which an optical write-in operation by a deflected beam starts and is called the optical write-in starting view angle: $\theta_C$. The angle $\theta_F$ is a view angle at which an optical write-in operation by a deflected beam is terminated and is called the optical write-in termination view angle: $\theta_F$.

The angle $\theta_S$ is a view angle at which a deflected beam is detected as a synchronizing beam by the light receiving device 10. This is the above-mentioned synchronizing beam detecting view angle and hereinafter called a synchronizing beam detecting view angle: $\theta_S$.

Since the optical path from the light source up to the deflecting/reflecting face 4A is fixed space-wise, each deflected beam is not affected by the chromatic aberration until it enters the scanning lens 5. Therefore, even if there is a wavelength difference in the two deflected beams, that difference does not appear until the beams pass through the scanning lens 5, so that irrespective of whether there is a difference in the wavelength, the above-mentioned optical write-in starting view angle $\theta_C$, the optical write-in termination view angle $\theta_F$, and the synchronizing beam detecting view angle $\theta_S$ are all common to the beams and are set by design.

If there is a wavelength difference in two beams to be deflected, the magnification chromatic aberration causes a difference between the beams in the optical path following the scanning lens 5. One of the two deflected beams which has a shorter wavelength than the other is called the deflected beam BM1, indicated by the dashed line. The other beam having a longer wavelength is called the deflected beam BM2, indicated by the broken line.

Suppose that at the optical write-in starting view angle of $\theta_C$, positions (optical write-in starting positions) of light spots of the deflected beams BM1 and BM2 on the scanned surface are C1 and C2 and the spacing between them is "$d_2$" as shown in the figure. Likewise, suppose that at the optical write-in terminating view angle of $\theta_F$, positions (optical write-in terminating positions) of light spots of the deflected beams BM1 and BM2 on the scanned surface are F1 and F2 and the spacing between them is "$d_3$" as shown in the figure.

Suppose also that at the synchronizing beam detecting view angle of $\theta_S$, positions of light spots of the deflected beams BM1 and BM2 on the light receiving face 10A are S1 and S2 and the spacing between them is "$d_1$" as shown in the figure.

The spacings $d_1$, $d_2$, and $d_3$ are supposed to have a positive or negative sign according to their direction, in such a manner that if a direction from C1 to C2m from F1 to F2, or from S1 to S2 is leftward in FIG. 8A, it is positive and, if that direction is rightward in FIG. 8A, it is negative.

Next, quantities of $\omega_1$-$\omega_3$ are defined as follows.

First, $\omega_1$ is defined to be the beam displacement quantity on the scanned surface corresponding to a change in the unit view angle at the synchronizing beam detecting view angle of $\theta_S$.

Next, $\omega_2$ is defined to be the beam displacement quantity on the scanned surface corresponding to a change in the unit view angle at the optical write-in starting view angle of $\theta_C$.

Likewise, $\omega_3$ is defined to be the beam displacement quantity on the scanned surface corresponding to a change in the unit view angle at the optical write-in termination angle of $\theta_F$.

Since in the above-described example the constant velocity characteristic has been corrected appropriately, the difference between the optical write-in starting time and the optical write-in termination time is small, and $d_2 \approx d_3$ and $\omega_2 \approx \omega_3$ because of symmetry, and $\omega_1$-$\omega_3$ are common to the deflected beams BM1 and BM2.

Consider now a parameter "$d_1/\omega_1$", which means a deflection angle necessary for the deflected beam BM1 or BM2 to be displaced over the above-mentioned distance of d.

Suppose here that the deflected beam BM1 has been detected by the light receiving device at the position S1 and that thereafter in a predetermined time lapse T an optical write-in operation starts at the position C1. Also suppose, on the other hand, that the deflected beam BM2 has been detected by the light receiving device at the position S2 and that in the predetermined time lapse T an optical write-in operation starts. In this case, the optical write-in operation starts at the position C2.

The light receiving device typically uses a slit, etc., to limit its light receiving region in area, thereby detecting both deflected beams BM1 and BM2 at the same position, which is supposed to be a position S1 for simplicity. Then, when the deflected beam BM2 is detected by the light receiving device, the deflected beam BM2 entering the scanning lens 5 precedes the synchronizing beam detecting view angle $\theta_S$ by the above-mentioned deflecting view angle $d_1/\omega_1$.

Figure 8B:
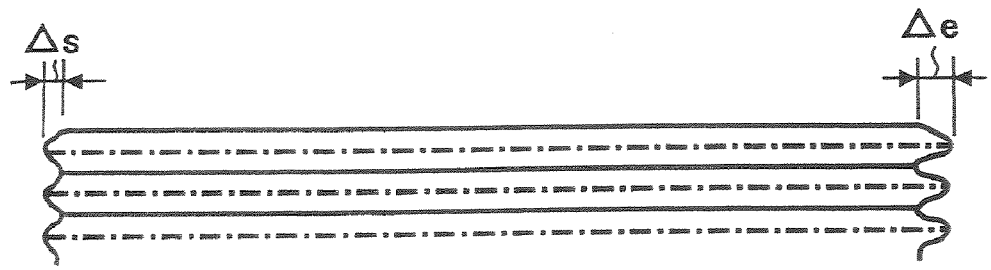

Because the deflected beam BM2 is displaced by $\omega_2$ for each unit view angle on the scanned surface 7 at the optical write-in starting view angle, the deflected beam BM2 starts a write-in operation at the position C1, not at the position C2, so that the difference $\Delta s$ in starting end of the scanning line on the optical write-in starting side shown in FIG. 8B is expressed as follows:

$$\Delta s = d_2 - (d_1/\omega_1)\omega_2$$

Furthermore, the difference $\Delta e$ in the terminating end of the scanning line on the optical write-in termination side is given by:

$$\Delta e = d_3 - (d_1/\omega_1)\omega_3, \text{ which can be expressed as follows, taking into account } \omega_2 = \omega_3:$$

$$\Delta e = d_3 - (d_1/\omega_1)\omega_2$$

The above-mentioned $\Delta s$ and $\Delta e$ are the vertical line fluctuation amplitude on the optical write-in starting side and the optical write-in terminating side respectively and are hereinafter called the vertical fluctuation quantity.

The case where there are two deflected beams has been described above. When there are three deflected beams or more, the above description can be enlarged with respect to two beams where the difference in the beams due to chromatic aberration becomes largest.

Thus, the vertical line fluctuations $\Delta s$ and $\Delta e$ can be expressed quantitatively, so that the above-mentioned specific example is calculated actually as follows. Suppose that for the scanning lenses 5 and 6, a change in the refractive index when the beam wavelength has been changed by 1 nm is −1.9E-04 (1/nm) and the difference in wavelength between the two light sources 1 and 1' is 10 nm, the following is given:

$d_1$=32 (μm), synchronizing beam detecting view angle: 45.2°
$d_2$=26 (μm), optical write-in starting view angle: 39°
$d_3$=−26 (μm), optical write-in terminating view angle: −39°
$\omega_1$=7.6 (mm/°)
$\omega_2=\omega_3$=7.7 (mm/°)

Therefore, the following is in turn given:

$$\Delta s=26-(32/7.6)\times 7.7=-6.4 \text{ μm}$$

$$\Delta e=-26-(32/7.6)\times 7.7=-58.4 \text{ μm}$$

Thus, the optical write-in starting side has the smaller value of the vertical line fluctuation quantity Δs, while the optical write-in terminating side has the larger value of the vertical line fluctuation quantity Δe. Moreover, in the background art example, a synchronizing beam passes through both the scanning lenses 5 and 6 and then is guided to the light receiving device 10, so that the optical scanner becomes large or the layout becomes difficult to carry out.

The above-mentioned specific example of a multi-beam scanner is described below with respect to embodiments of the present invention.

First Embodiment

Figure 1:
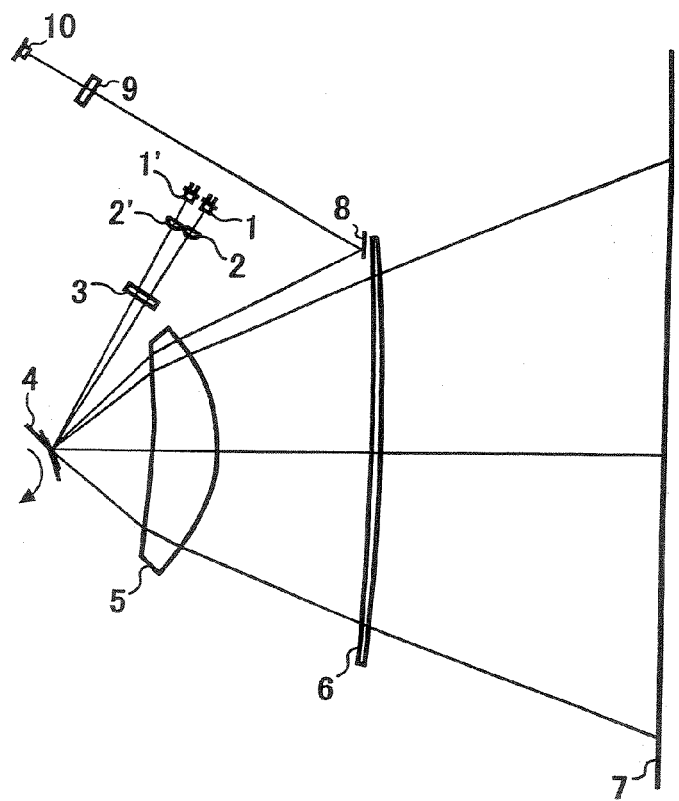
FIG. 1 is a schematic drawing of a multi-beam scanning apparatus according to a preferred embodiment of the present invention.

The multi-beam scanner illustrated in FIG. 7A is changed into a scanner as illustrated in FIG. 1. The specific data of both the optical system ranging from the light sources 1 and 1' to the rotary multi-facial mirror 4 and the scanning lenses 5 and 6 constituting the scanning image-forming optical system is the same as the above-mentioned data.

Unlike the background art example, in the first embodiment, a deflected beam to be detected as a synchronizing beam passes through the scanning lens 5 and is then guided to the light receiving element 10 without passing through the scanning lens 6. That is, a deflected beam to be received by the light receiving element 10 passes through the scanning lens 5 but not through the scanning lens 6 and is turned back at the mirror 8 to be guided to the light receiving element 10. The light receiving element 10 is arranged near an image forming point (i.e., image forming point by the scanning lens 5) in the main scanning direction of the deflected beam to be guided. Because the detected deflected beam is formed as an image in the main scanning direction only by the positive power in the main scanning direction which the scanning lens 5 has at its periphery in the main scanning direction, the optical path (385 mm) from the deflecting/reflecting face of the rotary multi-facial mirror 4 up to the above-mentioned image-forming point (light receiving face of the light receiving element) is set larger than the optical path (357 mm) from the deflecting/reflecting face up to the scanned surface 7.

Furthermore, to correct a change in the detection position caused by face-tilting of the deflecting/reflecting face, the cylindrical lens 9 having a positive power in the sub-scanning direction is arranged.

Supposing that the wavelength difference between the two light sources 1 and 1' is 10 nm, the following is given:

$d_1$=37 (μm), synchronizing beam detecting view angle: 45.2°
$d_2$=26 (μm) optical write-in starting view angle: 39°
$d_3$=−26 (μm), optical write-in terminating view angle: −39°
$\omega_1$=10.3 (mm/°)
$\omega_2=\omega_3$=7.7 (mm/°)

Accordingly, the following is in turn given:

$$\Delta s=26-(37/10.3)\times 7.7=-1.7 \text{ μm}$$

$$\Delta e=-26-(37/10.3)\times 7.7=-53.7 \text{ μm}$$

As compared to the above-mentioned background art example, the vertical line fluctuation quantity Δs on the optical write-in starting side has been reduced from −6.4 μm to −1.7 μm, while the vertical line fluctuation quantity Δe on the optical write-in terminating side has been improved by 8% approximately, from −58.4 μm to −53.7 μm.

As mentioned above, since $d_2 \approx d_3$, in order to reduce the vertical line fluctuation quantity Δe on the optical write-in terminating side, it is effective to reduce $(d_1/\omega_1)\times\omega_2$. Because "$\omega_2$" of $d_1$, $\omega_1$, and $\omega_2$ depends on the designing conditions of the multi-beam scanner, preferably the parameter $d_1/\omega_1$ should be reduced in value eventually.

To reduce the parameter $d_1/\omega_1$, preferably d1 should be decreased or $\omega_1$ should be increased in value. In the above-mentioned first embodiment, the displacement quantity $\omega_1$ is set large by setting the optical path from the deflecting/reflecting face to the light receiving element 1 which is a light receiving device larger than that from the deflecting/reflecting face to the scanned surface. If the above-mentioned optical path is merely set large, d1 is also increased, so that the parameter $d_1/\omega_1$ cannot always be decreased. Therefore, in the first embodiment, the deflected beam (synchronizing beam) to be detected by the light receiving element 10 passes through only the scanning lens 5 but not through the scanning lens 6, thus preventing d1 from being increased.

That is, because the scanning lenses 5 and 6 both have a positive power in the main scanning direction, in the case where there is a wavelength difference between the two deflected beams, if the deflected beam passes (like in the background art example) through both the scanning lenses 5 and 6 to be guided to the light receiving element 10, chromatic aberrations of the magnifications of these scanning lenses 5 and 6 have an additive effect to thereby increase the spacing d1, whereas in the first embodiment, the deflected beam passes through only the scanning lens 5 to be guided to the light receiving element 10 to thereby avoid being affected by the scanning lens 6 and so less affected by the chromatic aberration, thus mitigating an increase in the spacing $d_1$.

If the power of the scanning lens 6 at its periphery in the main scanning direction becomes larger, the positive power of the scanning lens 5 at its periphery in the main scanning direction is lowered relatively, thus further enhancing the effects of the present invention.

In the first embodiment, also, the light receiving face of the light receiving element 10 is arranged near the main scanning directional image-forming position of the deflected beam to be received. Accordingly, even if the reflecting point position is fluctuated by the deflecting/reflecting face of the rotary multi-facial mirror 4, the shift in position on the light receiving face is small, thus effectively preventing an increase in the vertical line fluctuation quantity caused by the fluctuation in reflecting point position.

Figure 5A:
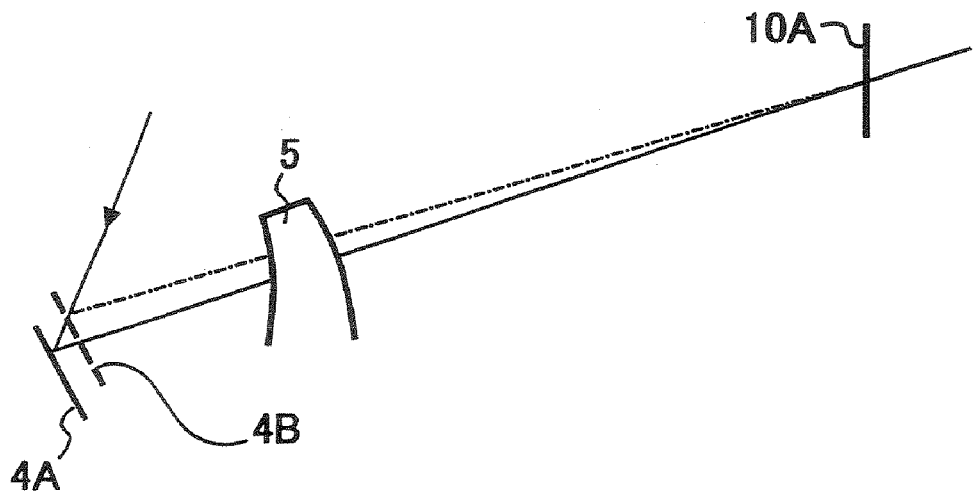
FIG. 5A and FIG. 5B are schematic drawings for explaining an effect of arranging a light receiving plane of a light receiving device in a vicinity of an image forming point of a synchronizing beam.

That is, as illustrated in FIG. 5A, because the deflected beam is transformed to an essentially parallel beam in the main scanning direction (irrespective some possible convergence or divergence), the image-forming position is hardly changed in the main scanning direction even if the reflecting point position is fluctuated to positions 4A and 4B as illustrated in FIG. 5A. Accordingly, by arranging the light receiving face 10A of the light receiving element at the above-mentioned image-forming position, the influence of the fluctuation in the reflecting point position can be eliminated or mitigated.

Figure 5B:
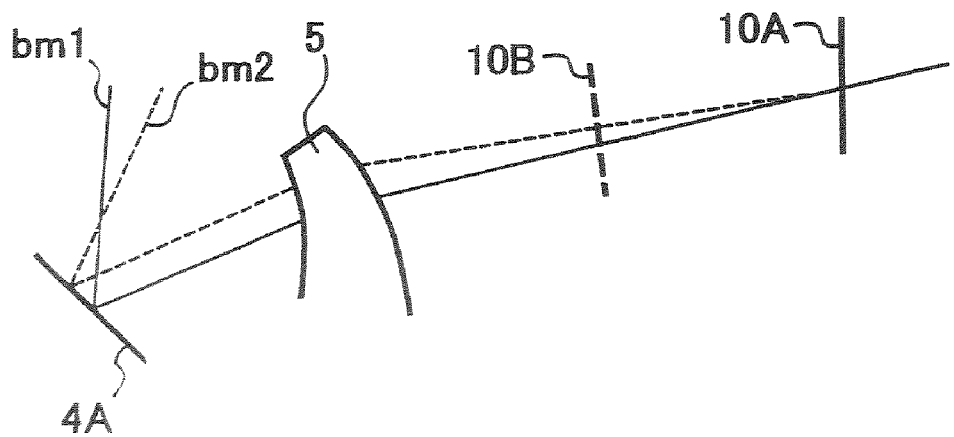

Furthermore, even if the reflecting point positions of the two beams bm1 and bm2 are fluctuated as illustrated in FIG. 5B, the light receiving face 10A of the light receiving element can be arranged near the main scanning directional image-forming position to thereby reduce a main scanning directional shift in position on the light receiving face 10A. If the light receiving face is provided at a position 10B, the main scanning directional position on the light receiving face differs between the beams bm1 and bm2, thus possibly resulting in an increase in the vertical line fluctuation.

Second Embodiment

Figure 2:
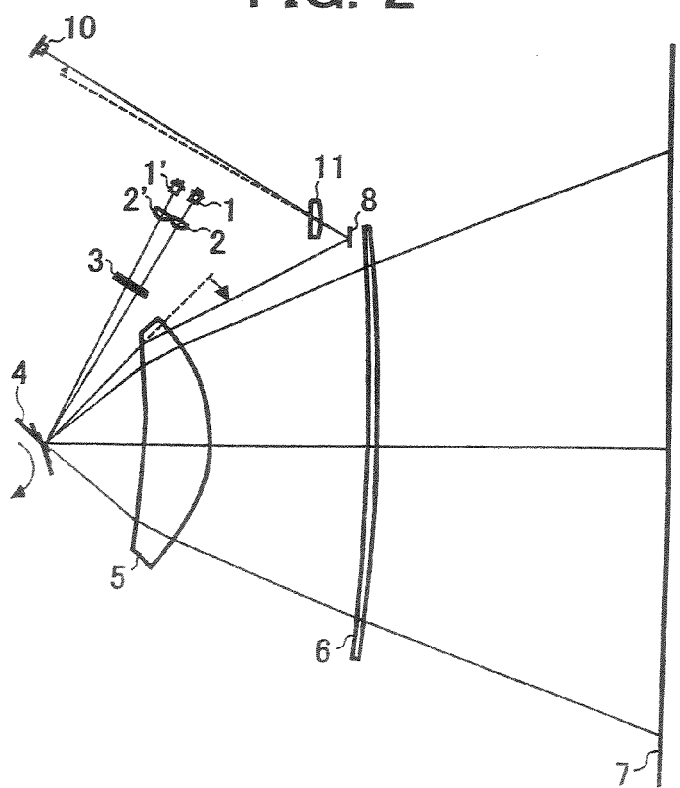
FIG. 2 is a schematic drawing of a multi-beam scanning apparatus according to another preferred embodiment of the present invention.

The multi-beam scanner shown in FIG. 7A has been changed to the scanner as illustrated in FIG. 2. The specific data of both the optical system ranging from the light sources 1 and 1' to the rotary multi-facial mirror 5 and the scanning lenses 5 and 6 constituting the scanning image-forming optical system is the same as that mentioned above.

A deflected beam to be detected by the light receiving element 10 passes through the scanning lens 5 but not through the scanning lens 6 to be turned back at the mirror 8 and then is guided to the light receiving element 10 via a converging lens 11 arranged distant from the scanning lens 5 by 196.1 mm calculated as an optical path.

The converging lens has the following parameters:
Main scanning directional shape of the incidence side face: arc with a curvature radius of 100 mm
Main scanning directional shape of the emission side: curvature radius of
Center thickness: 6 mm
Refractive index: 1.523946
Refractive index change for wavelength change of 1 nm: −1.97E-04 (1/nm)

To form an image of the deflected beam in the sub-scanning direction on the light receiving face of the light receiving element 10, the incidence face and/or the emission face have a sub-scanning directional power.

To use the converging lens 11 to thereby refract opposite to the refraction by the scanning lens 5, the deflected beam is used as a synchronizing beam, and the converging lens 11 has been shifted 4.7 mm upward with respect to the principal ray of the synchronizing beam in the figure. The converging lens 11 has its optical axis parallel to the optical axis of the scanning lenses 5 and 6.

In such a case, the principal rays of the synchronizing beams are deflected by the converging lens 11 in the same direction (away from the optical axis of the scanning lenses 5 and 6) in such a way that the shorter beams may be deflected larger and in such a direction as to come near the optical path of the beam with the larger wavelength. Accordingly, the spacing d1 between the synchronizing beams can be reduced on the light receiving face of the light receiving element 10. In this case, the optical path measures 279.8 mm in length from the deflecting/reflecting face to the light receiving face of the light receiving element 10.

Specifically, for a wavelength difference of 10 nm between the two light sources, the following is given:
$d_1=14.6$ (μm), synchronizing beam detecting view angle: 45.2°
$d_2=26$ (μm), optical write-in starting view angle: 39°
$d_3=-26$ (μm), optical write-in terminating view angle: −39°
$\omega_1=4.3$ (mm/°)
$\omega_2=\omega_3=7.7$ (mm/°)

Accordingly, the following is in turn given:

$$\Delta s = 26-(14.6/4.3)\times 7.7 = -0.1 \text{ μm}$$

$$\Delta e = -26-(14.6/4.3)\times 7.7 = -52.1 \text{ μm}$$

As compared to the above-mentioned background art example, the vertical line fluctuation quantity Δs on the optical write-in starting side has been reduced from −6.4 μm to −0.1 μm, while the vertical line fluctuation quantity Δe on the optical write-in terminating side has been improved by 10% approximately, from −58.4 μm to −52.7 μm.

If, in this case, the refractive index change quantity for a wavelength difference of 1 nm is increased to −3.94E-04 (1/nm), the following is given:

$$\Delta s = 26-(13.9/4.3)\times 7.7 = 1.1 \text{ μm}$$

$$\Delta e = -26-(13.9/4.3)\times 7.7 = -50.9 \text{ μm}$$

Accordingly, the vertical line fluctuation is further decreased.

In this embodiment, $\omega_1$ is made smaller than in the background art example and the first embodiment. Although this may contribute to an increase in the parameter $d_1/\omega_1$, the value of d1 is so decreased as to overcome this increasing factor, thus decreasing the parameter $d_1/\omega_1$ resultantly.

Third Embodiment

Figure 3:
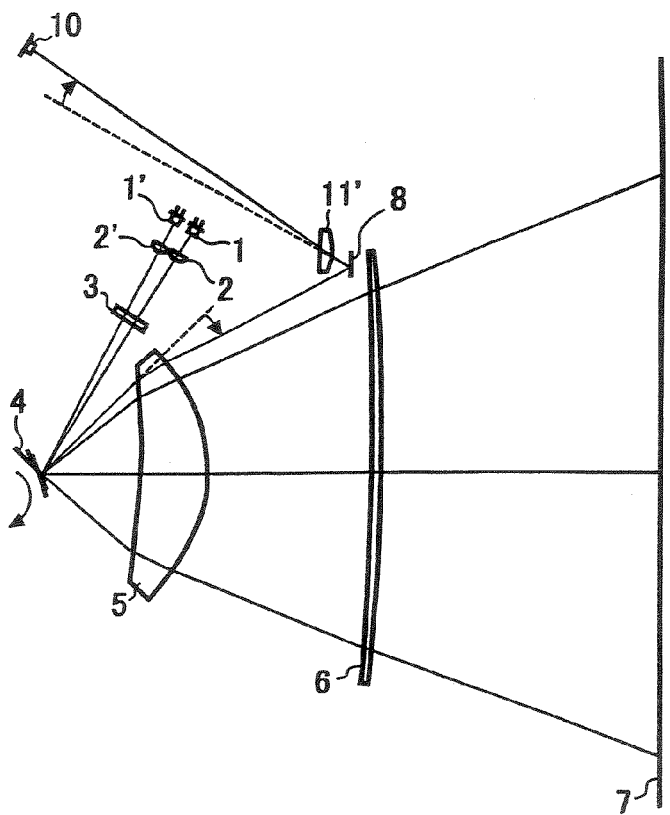
FIG. 3 is a schematic drawing of a multi-beam scanning apparatus according to yet another preferred embodiment of the present invention.

The multi-beam scanner illustrated in FIG. 7A has been changed to the scanner as illustrated in FIG. 3. The specific data of both the optical system ranging from the light sources 1 and 1' to the rotary multi-facial mirror 4 and the scanning lenses 5 and 6 constituting the scanning image-forming optical system is the same as that mentioned above.

A deflected beam to be detected by the light receiving element 10 passes through the scanning lens 5 but not through the scanning lens 6 to be turned back at the mirror 8 and then is guided to the light receiving element 10 via a prism 11' arranged distant from the scanning lens 5 by 197.4 mm calculated as an optical path.

The prism 11' is constructed as follows.

Its incidence side face is inclined 18° in a plane parallel to the figure (i.e., plane parallel to both the main scanning direction and the optical axis of the scanning lenses 5 and 6). Its emission side face is perpendicular to the optical axis of the scanning lenses 5 and 6.

Refractive index: 1.523946

Refractive index change quantity for a wavelength difference of 1 nm: −3.94E-04 (1/nm)

To form an image of the synchronizing beam in the sub-scanning direction on the emission side face of the light receiving element 10, the incidence side face and/or the emission side face are provided with a positive power in the sub-scanning direction.

Like in the case of the second embodiment, in this third embodiment also, the principal rays of the synchronizing beams are deflected by the prism 11' in the same direction (away from the optical axis of the scanning lenses 5 and 6) in such a way that the shorter beams may be deflected more and in such a direction as to come near the optical path of the beam with a larger wavelength. Accordingly, the spacing d1 between the synchronizing beams can be reduced on the light receiving face of the light receiving element 10. In this case, the optical path measures 349.8 mm in length from the deflecting face to the light receiving element, longer than in the second embodiment. Accordingly, in this embodiment, $d_1$ can be made smaller and, at the same time, $\omega_1$ can be made larger.

Specifically, for a wavelength difference of 10 nm between the two light sources, the following is given:
$d_1$=6.5 (μm), synchronizing beam detecting view angle: 45.2°
$d_2$=26 (μm), optical write-in starting view angle: 39°
$d_3$=−26 (μm), optical write-in terminating view angle: −39°
$\omega_1$=10.1 (mm/°)
$\omega_2$=$\omega_3$=7.7 (mm/°)

Accordingly, the following is in turn given:

$\Delta s$=26−(6.5/10.1)×7.7=21.0 μm $\Delta e$=−26−(6.5/10.1)×7.7=−31.0 μm

As compared to the above-mentioned background art example, the vertical line fluctuation quantity $\Delta s$ on the optical write-in starting side has been increased from −6.4 μm to −31.0 μm, whereas the vertical line fluctuation quantity $\Delta e$ on the optical write-in terminating side has been improved by 50% approximately, from −58.4 μm to −31.0 μm. The vertical line fluctuation quantity on the optical write-in starting side of $\Delta s$=21.0 μm is actually of no problem, so that the vertical line fluctuation quantity can be reduced on both the optical write-in starting and terminating sides, thus conducting extremely good multi-beam scanning.

In the third embodiment, as mentioned above, the $d_1$ is reduced and $\omega_1$ is enlarged, so that the parameter $d_1/\omega_1$ is reduced, thus effectively decreasing the vertical line fluctuation quantity.

Fourth Embodiment

Figure 4:
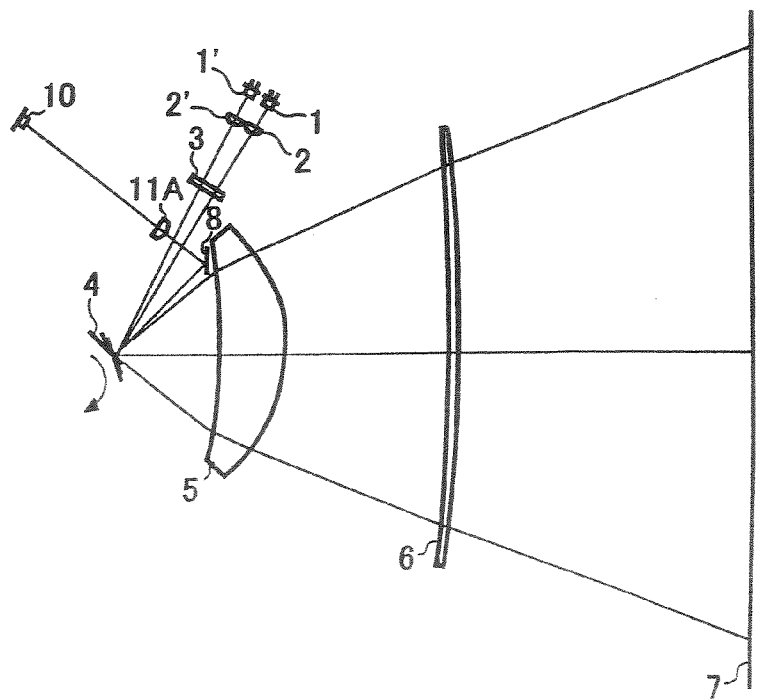
FIG. 4 is a schematic drawing of a multi-beam scanning apparatus according to yet another preferred embodiment of the present invention.

The multi-beam scanner illustrated in FIG. 7A has been changed to a scanner as illustrated in FIG. 4. The specific data of both the optical system ranging from the light sources 1 and 1' to the rotary multi-facial mirror 4 and the scanning lenses 5 and 6 constituting the scanning image-forming optical system is the same as that mentioned above.

In this fourth embodiment, a deflected beam to be detected by the light receiving element 10 does not pass through the scanning lens 5 but is turned back at the mirror 8 and then passes through the optical axis of a converging lens 11A to be guided to the light receiving element 10. The converging lens 11A has positive powers mutually different in the main scanning direction and the sub-scanning direction so as to form an image of a synchronizing beam on the light receiving face of the light receiving element 10 in the main scanning and sub-scanning directions.

Because in the fourth embodiment the synchronizing beam does not pass through either scanning lens 5 or 6, it is not affected by the achromatic aberration at the scanning lenses 5 and 6.

Accordingly, for a wavelength difference of 10 nm between the two light sources, the following is given:
$d_1$=0.0 (μm), synchronizing beam detecting view angle: 45.2°
$d_2$=26 (μm), optical write-in starting view angle: 39°
$d_3$=−26 (μm), optical write-in terminating view angle: −39°
$\omega_2$=$\omega_3$=7.7 (mm/°)

Accordingly, the following is in turn given:

$\Delta s$=26−0.0=26.0 μm $\Delta e$=−26−0.0=−26.0 μm

That is, in this fourth embodiment, d1 has been made 0 to thereby minimize the parameter $D_1/\omega_1$ Thus, in the fourth embodiment, the vertical line fluctuation quantity is almost the same as each other on both the optical write-in starting and terminating sides and actually of no problem, so that the vertical line fluctuation quantity can be reduced on both the optical write-in starting and terminating sides, thus enabling conducting extremely good multi-beam scanning.

The synchronizing beam detecting method according to any one of the above-mentioned first through fourth embodiments includes the steps of deflecting at an equiangular velocity beams from the plurality of light sources 1 and 1', modulated independently according to an image signal, by using the common deflector 4, converging thus deflected beams to the scanned surface 7 using the scanning image-forming optical systems 5 and 6, forming on the scanned surface 7 a plurality of light spots separated from each other in the sub-scanning direction, and using the plurality of light spots for simultaneously scanning a plurality of scanning lines in a multi-beam scanner. In the method, to control the optical write-in start of the beams scanning the scanning lines, the beams deflected toward an optical write-in starting portion are detected as a synchronizing beam, the light receiving device 10 for receiving the deflected beams and the synchronizing beam optical system for sequentially and individually guiding the deflected beams to the light receiving device 10 constitute in combination the synchronization detecting system, so as to thereby generate a reception light signal for each of the deflected beams from the light receiving device 10. The synchronization detecting system is configured such that supposing, as for the synchronizing beam detecting view angle θS, that the maximum shift in main scanning directional beam position occurring at the location of the light receiving face 10A of the light receiving device 10 caused by an inter-beam wavelength difference is $d_1$, and the beam displacement quantity at the location of the light receiving face 10A corresponding to a unit view angle change at the synchronizing beam detecting view angle $\theta_S$ is $\omega_1$, the parameter $d_1/\omega_1$, may be reduced. Further, some of the lenses (scanning lens 5) contained in the scanning image-forming optical system 5 or 6 may be utilized as a part of the synchronizing beam optical system of the synchronization detecting system, or the dedicated optical system 11A may be used as the synchronizing beam optical system of the synchronization detecting system to thus render the parameter $d_1/\omega_1$ to 0.

Furthermore, the multi-beam scanner described in the above-mentioned first embodiment includes the plurality of light sources 1 and 1' emitting beams independently modulated according to an image signal, the deflector 4 having the deflecting/reflecting face and deflecting at an equiangular velocity beams from the plurality of light sources 1 and 1', the scanning image-forming optical systems 5 and 6 guiding the beams deflected by the deflector 4 to the scanned surface 7 to thereby form a plurality of light spots on the above-mentioned scanned surface, the light receiving device 10 common to the plurality of beams and sequentially and individually receiving the beams deflected toward the optical write-in starting portion on the scanned surface 7, and the synchronizing beam optical systems 5, 8, and 9 guiding the deflected beams to the light receiving device 10. The scanning image-forming optical system has two positive scanning lenses or more having a region with a positive power in the main scanning direction on the optical write-in starting side. The deflected beams to be detected by the light receiving device 10 pass through at least one of the at least two positive scanning lenses but not through all of them and then are guided to the light receiving device 10. The optical path from the deflector 4 to the light receiving device 10 is made longer than that from the deflector 4 to the scanned surface 7 in the synchronizing beam optical systems 5, 8, and 9. The light receiving face of the light receiving device 10 is arranged near the image forming position in the main scanning direction of the deflected beams guided by the synchronizing beam optical systems 5, 8, and 9, where the synchronizing beam optical system 5, 8, and 9 have the anamorphic optical element 9 for forming an image of the deflected beams in the sub-scanning direction near the light receiving face of the light receiving device 10.

Furthermore, the scanning image-forming optical system includes the two positive scanning lenses 5 and 6 having a region with a positive power in the main scanning direction on the optical write-in starting side, and one of the two lenses present on the side of the deflector (lens 5) may constitute a part of the synchronizing beam optical system.

The multi-beam scanner described in the second and third embodiments includes the plurality of light sources 1 and 1' emitting beams individually modulated according to the image signal, the deflector 4 having the deflecting/reflecting face and deflecting at an equiangular velocity the beams from the plurality of light sources, the scanning image-forming optical system 5 and 6 guiding the beams deflected by the deflector 4 to the scanned surface 7 to thereby form a plurality of light spots on the scanned surface 7, the light receiving device 10 common to the plurality of beams and sequentially and individually receiving the beams deflected toward the optical write-in starting portion on the scanned surface 7, and the synchronizing beam optical systems 5, 8, and 11 (or 11') guiding the deflected beams to the light receiving device 10. The scanning image-forming optical system has at least one scanning lens, and the synchronizing beam optical system is constituted by the at least one scanning lens 5 and at least one refracting optical element 11 (or 11') to thereby pass the deflected beams to be detected by the light receiving device 10 through the at least one scanning lens 5 and then deflect the principal rays of thus passed deflected beams at the refracting optical element 11 (or 11') in order to guide them to the light receiving device 10, so that the difference in refracting action of the refracting optical element 11 (or 11') caused by a wavelength difference of the deflected beams may be utilized to reduce the shift due to a wavelength difference of deflected beams of the incidence position of the deflected beams upon the light receiving device at the synchronizing beam detecting angle.

Additionally, the scanning image-forming optical system may be constituted of two lenses, the scanning lenses 5 and 6, which are positive lenses having a region with a positive power in the main scanning direction on the optical write-in starting side, and one the two lenses present on the deflector side (lens 5) constitutes a part of the synchronizing beam optical system.

In the multi-beam scanner of the second embodiment, the refracting optical element 11 is a converging lens having a positive power in the main scanning direction and arranged decentered to deflect the principal ray of the incident deflected beam, thus utilizing the main scanning directional positive power to form the deflected beam in the main scanning direction into an image near the light receiving face of the light receiving device.

Furthermore, in the multi-beam scanner of the third embodiment, the refracting optical element 11' is a wedge-shaped prism, at least one face of which has a positive power in the sub-scanning direction, which power is utilized to form the deflected beam in the sub-scanning direction into an image near the light receiving face of the light receiving device. Moreover, the multi-beam scanner described in any of the second and third embodiments is capable of setting a rate of change in refractive index caused by the wavelength of the refracting optical elements 11 and 11' that is larger than that of the scanning lens constituting a part of the synchronizing beam optical system.

The multi-beam scanner of the fourth embodiment includes the plurality of light sources 1 and 1' emitting beams independently modulated according to the image signal, the deflector 4 having the deflecting/reflecting face and deflecting at an equiangular velocity beams from the plurality of light sources, the scanning image-forming optical systems 5 and 6 guiding the beams deflected by the deflector 4 to the scanned surface 7 to thereby form a plurality of light spots on the scanned surface 7, the light receiving device 10 common to the plurality of beams and sequentially and individually receiving the beams deflected toward the optical write-in starting portion on the scanned surface 7, and the synchronizing beam optical systems 8 and 11A guiding the deflected beams to the light receiving device 10. The scanning image-forming optical systems 5 and 6 and the synchronizing beam optical systems 8 and 11A are mutually separate optical systems, such that the synchronizing beam optical system may guide the deflected beams to the same position on the light receiving face of the light receiving device irrespective of the wavelength at the synchronizing beam detecting view angle.

Furthermore, the synchronizing beam optical system 11A is a converging lens.

Additionally, in the multi-beam scanner described in any of the first through fourth embodiments, there may be provided two light sources 1 and 1' emitting beams independently modulated according to the image signal. The two light sources 1 and 1' are mutually separate semiconductor lasers, and beams from them are incident via the coupling lenses 2 and 2' onto the deflector 4 with their respective opening angles, and principal rays of the beams intersect with the main scanning direction near the deflecting/reflecting face of the deflector 4, or the beams from these semiconductor lasers 1 and 1' are formed near the deflecting/reflecting face of the deflector 4 by the line image-forming optical system 3 as line images which are long in the main scanning direction and mutually separated in the sub-scanning direction.

Thus, by the multi-beam scanner of any of the first through fourth embodiments, beams from the plurality of light sources emitting beams independently modulated according to the image signal can be deflected at an equiangular velocity by the common deflector 4 to thereby converge thus deflected beams by the scanning image-forming optical systems 5 and 6 toward the scanned surface 7 in order to form a plurality of light spots, which can be utilized to simultaneously scan a plurality of scanning lines in multi-beam scanning with the mitigated vertical line fluctuation due to the difference in wavelength of the beams.

Finally, an image forming apparatus according to an embodiment of the present invention is described below with reference to FIG. 9.

The image forming apparatus in this embodiment is a laser printer.

A laser printer 100 has a photo-conductive member formed in a cylinder as a photosensitive medium 111. Around the photosensitive medium 111 are arranged a charging roller 112 as a charging device, a developing apparatus 113 as a visualizing device, a transfer roller 114, and a cleaning apparatus 115. The charging device may be a technically known corona charger.

Furthermore, a multi-beam scanner 117 using laser flux LB is provided for conducting exposure by multi-beam scanning between the charging roller 112 and the developing apparatus 113.

Figure 9:
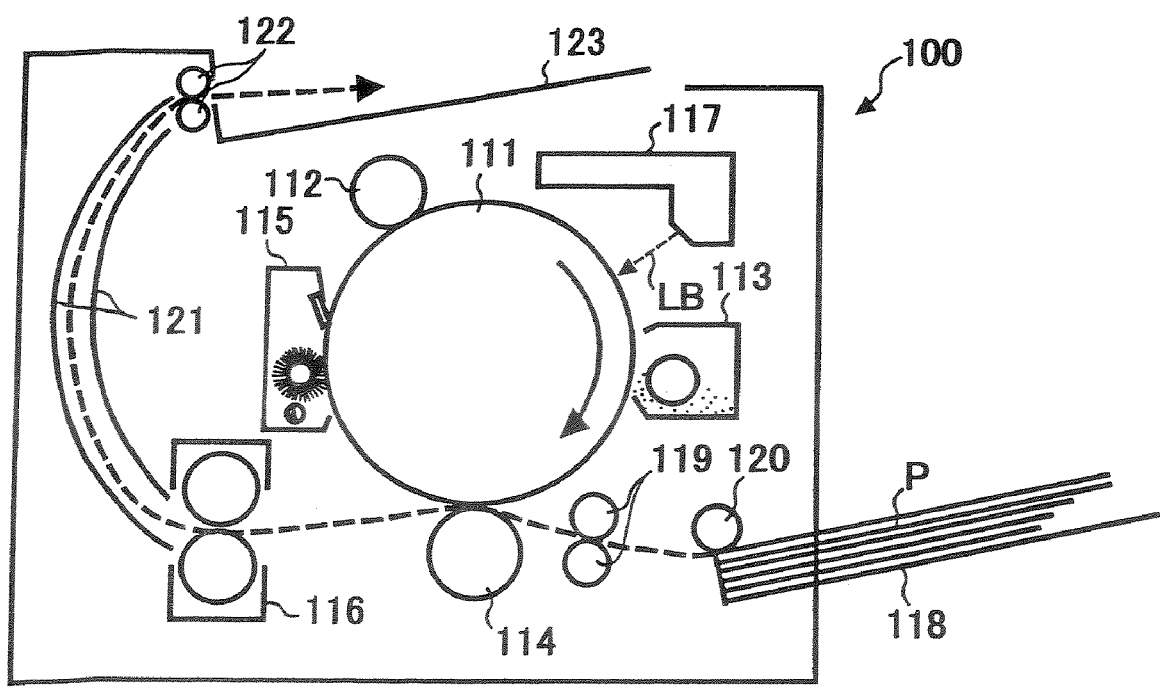
FIG. 9 is a schematic drawing of an image forming apparatus according to an embodiment of the present invention.

In FIG. 9, a reference numeral 116 indicates a fixing apparatus, a reference numeral 118 indicates a cassette, a reference numeral 119 indicates a registration roller pair, a reference numeral 120 indicates a sheet feeding roller, a reference numeral 121 indicates a carrying path, a reference numeral 122 indicates a sheet discharging roller pair, a reference numeral 123 indicates a tray, and a reference sign P indicates transfer paper as a recording medium.

When an image is to be formed, the photosensitive medium 111, which is a photo-conductive member, is rotated clockwise at a constant speed, so that its surface is charged by the charging roller 112 and exposed in multi-beam scanning by the multi-beam scanner 117 to thereby form an electrostatic latent image. The formed electrostatic latent image is a so-called negative latent image with its image portion exposed.

This electrostatic latent image undergoes reversal developing at the developing apparatus 113 to thereby form a toner image on the photosensitive medium 111.

The cassette 118 containing the transfer paper P is attachable to and detachable from the body of the image forming apparatus 100, so that when attached thereto as illustrated in FIG. 9, an uppermost sheet of the contained transfer paper P is fed by the sheet feeding roller 120. The transfer paper P thus fed has its tip caught by the registration roller pair 119. Timed to the movement of the toner image on the photosensitive medium 111 to its transfer position, the registration roller pair 119 feeds the transfer paper P to the transferring portion. At the transferring portion, the transfer paper P is superposed with the toner image to have the toner image electro-statically transferred thereon by the action of the transfer roller 114. The transfer paper P with the toner image thus transferred thereon is fed to the fixing apparatus 116, where the toner image is fixed thereon, and then passes through the carrying path 121 to be discharged onto the tray 123 by the sheet discharging roller pair 122. After the toner image is transferred, the surface of the photosensitive medium 111 is cleaned by the cleaning apparatus 115 to remove the residual toner, paper particles, etc.

In the above image forming apparatus 100, in place of the transfer paper P, an OHP sheet etc. may be used. Further, the toner image may be transferred to the transfer sheet P via an intermediate transfer medium such as an intermediate transfer belt. As the optical scanner 117, the multi-beam scanner described in any one of the above-mentioned embodiments can be used to form a good image.

Thus, the image forming apparatus performs optical scanning on the photosensitive surface of the photosensitive medium 111 by using the multi-beam scanner 117 to thereby form a latent image and visualize it, and the multi-beam scanner 117 for optical scanning on the photosensitive surface of the photosensitive medium may be configured according to any of the above-mentioned embodiments.

Further, the photosensitive medium 111 may be a photoconductive member and an electrostatic latent image formed by uniform charging of the photosensitive surface of the photoconductive member and optical scanning by the optical scanner may be visualized as a toner image.

Furthermore, in the image forming apparatus, the photosensitive medium may be a silver salt photographic film. In this case, a latent image formed by optical scanning by the optical scanner can be visualized by a usual developing method for use in the silver salt photographing processes. Such an image forming apparatus can be practiced as, for example, an optical plate making apparatus or an optical drawing apparatus.

Furthermore, the image forming apparatus can be practiced specifically as a laser printer as described above, or a laser plotter, a digital copy machine, or a facsimile machine.

Numerous additional modifications and variations of the present invention are possible in light of the above teachings. It is therefore to be understood that within the scope of the appended claims, the present invention may be practiced otherwise than as specifically described herein.

What is claimed is:

1. A multi-beam scanner, comprising:
a plurality of light sources configured to emit beams independently modulated according to an image signal, respectively;
a deflector having a deflecting/reflecting face and configured to deflect the beams emitted from the plurality of light sources at an equiangular velocity;
a scanning image-forming optical system configured to guide the beams deflected by the deflector to a scanned surface so as to be formed into a plurality of light spots on the scanned surface;
a light receiving device configured to sequentially and individually receive the beams deflected toward optical write-in starting portions on the scanned surface as synchronizing beams, the light receiving device being common to the synchronizing beams; and
a synchronizing beam optical system that guides the beams deflected to the optical write-in starting portions to the light receiving device, the scanning image-forming optical system having at least one scanning lens, the synchronizing beam optical system including at least one of the at least one scanning lens and a refracting optical element, each deflected beam to be received by the light receiving device passing through the at least one of the at least one scanning lens and a principal ray of the deflected beam passed through the scanning lens being deflected by the refracting optical element so as to be guided to the light receiving device, and a shift, due to a difference in wavelength of the deflected beam, of an incidence position on the light receiving device of the deflected beam in a synchronizing beam detecting angle being reduced by a difference in a refracting action of the refracting optical element due to the deflected beam wavelength difference.

2. The multi-beam scanner of claim 1, wherein the scanning image-forming optical system includes at least two scanning lenses having a region having a positive power in a main scanning direction on an optical write-in starting side thereof, a first of the at least two scanning lenses present on a side of the deflector constituting a part of the synchronizing beam optical system.

3. The multi-beam scanner of claim 1, wherein the refracting optical element comprises a converging lens having a positive power in a main scanning direction and is decentered to deflect a principal ray of an incident deflected beam, so as to converge the deflected beam in the main scanning direction in a vicinity of the light receiving face of the light receiving device by the positive power of the main scanning direction.

4. The multi-beam scanner of claim 1, wherein the refracting optical element includes a wedge-shaped prism.

5. The multi-beam scanner of claim 4, wherein at least one face of the wedge-shaped prism has a positive power in a sub-scanning direction, so that the deflected beam is converged in the sub-scanning direction in a vicinity of the light receiving face of the light receiving device by the positive power.

6. The multi-beam scanner of claim 1, wherein a change rate due to wavelength of a refractive index of the refracting optical element is set larger than that of the at least one scanning lens constituting a part of the synchronizing beam optical system.

7. The multi-beam scanner of claim 1, wherein the plurality of light sources includes at least two light sources that modulate beams individually according to an image signal.

8. The multi-beam scanner of claim 7, wherein the at least two light sources are mutually separate semiconductor lasers, and the beams from the semiconductor lasers are incident onto the deflector with respective opening angles in the main scanning direction via a coupling lens.

9. The multi-beam scanner of claim 8, wherein principal rays of the beams from the semiconductor lasers intersect in the main scanning direction in a vicinity of the deflecting/reflecting face of the deflector.

10. The multi-beam scanner of claim 8, wherein the beams from the semiconductor lasers are formed by a line image-forming optical system into line images long in the main scanning direction and mutually separated in the sub-scanning direction.

11. A multi-beam scanner, comprising:
a plurality of beam emitting means for emitting beams independently modulated according to an image signal, respectively;
deflecting means for deflecting the beams emitted from the plurality of beam emitting means at an equiangular velocity;
scanning image-forming means for guiding the beams deflected by the deflecting means to a scanned surface so as to be formed into a plurality of light spots on the scanned surface;
light receiving means for sequentially and individually receiving the beams deflected toward optical write-in starting portions on the scanned surface as synchronizing beams, the light receiving means being common to the synchronizing beams; and
synchronizing beam guiding means for guiding the beams deflected by the deflecting means to the optical write-in starting portions to the light receiving means, the scanning image-forming means having at least one scanning lens, the synchronizing beam guiding means having at least one of the at least one scanning lens and a refracting optical element, each deflected beam to be received by the light receiving means passing through the at least one of the at least one scanning lens and a principal ray of the deflected beam passed through the at least one scanning lens being deflected by the refracting optical element so as to be guided to the light receiving means, and a shift, due to a difference in wavelength of the deflected beam, of an incidence position on the light receiving means of the deflected beam in a synchronizing beam detecting angle being reduced by a difference in a refracting action of the refracting optical element due to the deflected beam wavelength difference.

12. A method of multi-beam scanning, comprising the steps of:
emitting from a plurality of light sources beams independently modulated according to an image signal, respectively;
deflecting the beams emitted from the plurality of light sources by a deflector at an equiangular velocity;
guiding the deflected beams to a scanned surface by a scanning image-forming optical system so as to be formed into a plurality of light spots on the scanned surface, separated from each other in a sub-scanning direction; and
sequentially and individually guiding the beams deflected toward optical write-in starting portions on the scanned surface by a synchronizing beam optical system so as to be received by a light receiving device common to the guided beams, the scanning image-forming optical system having at least one scanning lens, the synchronizing beam optical system including at least one of the at least one scanning lens and a refracting optical element, each deflected beam to be received by the light receiving device passing through the at least one of the at least one scanning lens and a principal ray of the deflected beam passed through the at least one scanning lens being deflected by the refracting optical element so as to be guided to the light receiving device, and a shift, due to a difference in wavelength of the deflected beam, of an incidence position on the light receiving device of the deflected beam in a synchronizing beam detecting angle being reduced by a difference in a refracting action of the refracting optical element due to the deflected beam wavelength difference.

13. The method of claim 12, wherein the scanning image-forming optical system includes at least two scanning lenses having a region having a positive power in the main scanning direction on an optical write-in starting side thereof, at least one of the at least two scanning lenses present on a side of the deflector constituting a part of the synchronizing beam optical system.

14. The method of claim 12, wherein the refracting optical element comprises at least one converging lens having a positive power in a main scanning direction, and being decentered to deflect a principal ray of an incident deflected beam so as to converge the deflected beam in the main scanning direction in a vicinity of the light receiving face of the light receiving device by the positive power of the main scanning direction.

15. The method of claim 12, wherein the refracting optical element is a wedge-shaped prism.

16. The method of claim 15, wherein at least one face of the wedge-shaped prism has a positive power in the sub-scanning direction, wherein a deflected beam is converged in the sub-scanning direction in a vicinity of the light receiving face of the light receiving device by the positive power.

17. The method of claim 12, wherein a change rate due to wavelength of a refractive index of the refracting optical element is set larger than that of the scanning lenses comprising a part of the synchronizing beam optical system.

18. The method of claim 12, wherein the plurality of light sources includes at least two light sources that modulate beams individually according to an image signal.

19. The method of claim 18, wherein the at least two light sources are mutually separate semiconductor lasers, and the beams from the semiconductor lasers are incident onto the deflector with respective opening angles in the main scanning direction via a coupling lens.

20. The method of claim 19, wherein principal rays of the beams from the semiconductor lasers intersect in the main scanning direction in a vicinity of a deflecting/reflecting face of the deflector.

21. The method of claim 19, wherein the beams from the semiconductor lasers being formed by a line image-forming optical system into the images long in the main scanning direction and mutually separated in the sub-scanning direction.

22. An image forming apparatus, comprising:
a photosensitive medium having a photosensitive surface;
a charging device configured to uniformly charge the photosensitive surface;
a multi-beam scanner configured to scan the uniformly charged photosensitive surface of the photosensitive medium to form a latent image on the photosensitive surface; and
a visualizing device configured to visualize the latent image, the multi-beam scanner including, a plurality of light sources configured to emit beams independently modulated according to an image signal, respectively;
a deflector having a deflecting/reflecting face and configured to deflect the beams emitted from the plurality of light sources at an equiangular velocity;
a scanning image-forming optical system configured to guide the beams deflected by the deflector to the photosensitive surface of the photosensitive member so as to be formed into a plurality of light spots constituting the latent image on the photosensitive surface;
a light receiving device configured to sequentially and individually receive the beams deflected toward optical write-in starting portions on the photosensitive surface as synchronizing beams, the light receiving device being common to the synchronizing beams; and
a synchronizing beam optical system configured to guide the beams deflected to the optical write-in starting portions to the light receiving device, the scanning image-forming optical system having at least one scanning lens, the synchronizing beam optical system including at least one of the at least one scanning lens and a refracting optical element, each deflected beam to be received by the light receiving device passing through the at least one of the at least one scanning lens and a principal ray of the deflected beam passed through the scanning lens being deflected by the refracting optical element so as to be guided to the light receiving device, and a shift, due to a difference in wavelength of the deflected beam, of an incidence position on the light receiving device of the deflected beam in a synchronizing beam detecting angle being reduced by a difference in a refracting action of the refracting optical element due to the deflected beam wavelength difference.

23. The image forming apparatus of claim 22, wherein the scanning image-forming optical system includes at least two scanning lenses having a region having a positive power in the main scanning direction on an optical write-in starting side thereof, one of the at least two scanning lenses present on a side of the deflector constituting a part of the synchronizing beam optical system.

24. The image forming apparatus of claim 22, wherein the refracting optical element comprises a converging lens having a positive power in a main scanning direction, and is decentered to deflect a principal ray of an incident deflected beam so as to converge the deflected beam in a main scanning direction in the vicinity of the light receiving face of the light receiving device by the positive power of the main scanning direction.

25. The image forming apparatus of claim 22, wherein the refracting optical element is a wedge-shaped prism.

26. The image forming apparatus of claim 25, wherein at least one face of the wedge-shaped prism has a positive power in the sub-scanning direction, so that a deflected beam is converged in the sub-scanning direction in the vicinity of the light receiving face of the light receiving device by the positive power.

27. The image forming apparatus of claim 22, wherein a change rate due to wavelength of a refractive index of the refracting optical element is set larger than that of the scanning lenses constituting a part of the synchronizing beam optical system.

28. The image forming apparatus of claim 22, wherein the plurality of light sources includes the at least two light sources that modulate beams individually according to an image signal.

29. The image forming apparatus of claim 28, wherein the at least two light sources are mutually separate semiconductor lasers, and the beams from the semiconductor lasers are incident onto the deflector with respective opening angles in the main scanning direction via a coupling lens.

30. The image forming apparatus of claim 29, wherein principal rays of the beams from the semiconductor lasers intersect in the main scanning direction in a vicinity of the deflecting/reflecting face of the deflector.

31. The image forming apparatus of claim 29, wherein the beams from the semiconductor lasers are formed by a line image-forming optical system into line images long in the main scanning direction and mutually separated in the sub-scanning direction.

32. The image forming apparatus of claim 22, wherein the photosensitive medium comprises a photoconductive member and the latent image is visualized by the visualizing device to a toner image.

33. An image forming apparatus, comprising:
a photosensitive medium having a photosensitive surface;
charging means for uniformly charging the photosensitive surface;
a multi-beam scanner configured to scan the uniformly charged photosensitive surface of the photosensitive medium to form a latent image on the photosensitive surface; and
visualizing means for visualizing the latent image, the multi-beam scanner including, a plurality of beam emitting means for emitting beams independently modulated according to an image signal, respectively;
deflecting means for deflecting the beams emitted from the plurality of beam emitting means at an equiangular velocity;
scanning image-forming means for guiding the beams deflected by the deflecting means to the photosensitive surface of the photosensitive member so as to be formed into a plurality of light spots constituting the latent image on the photosensitive surface;
light receiving means for sequentially and individually receiving the beams deflected toward optical write-in starting portions on the photosensitive surface as synchronizing beams, the light receiving means being common to the synchronizing beams; and
synchronizing beam guiding means for guiding the beams deflected to the optical write-in starting portions to the light receiving device, the scanning image-forming means having at least one scanning lens, the synchronizing beam guiding means including at least one of the at least one scanning lens or and a refracting optical element, each deflected beam to be received by the light receiving means passing through the at least one of the at least one scanning lens and a principal ray of the deflected beam passed through the at least one scanning lens being deflected by the refracting optical element so as to be guided to the light receiving means, and a shift, due to a difference in wavelength of the deflected beam, of an incidence position on the light receiving means of the deflected beam in a synchronizing beam detecting angle being reduced by a difference in a refracting action of the refracting optical element due to the deflected beam wavelength difference.

* * * * *